United States Patent
Nienaber et al.

(10) Patent No.: US 12,275,115 B2
(45) Date of Patent: *Apr. 15, 2025

(54) ROBOTIC PAINT REPAIR

(71) Applicant: 3M INNOVATIVE PROPERTIES COMPANY, St. Paul, MN (US)

(72) Inventors: Aaron K. Nienaber, Lake Elmo, MN (US); Mark W. Orlando, Chesterfield Township, MI (US); Nathan J. Herbst, Woodbury, MN (US); Christie L. Vitale, Hudson, WI (US); Marc Eberwein, Velbert (DE); Brett R. Hemes, Woodbury, MN (US); Jonathan B. Arthur, Hudson, WI (US); Thomas J. Strey, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,266

(22) Filed: Nov. 9, 2023

(65) Prior Publication Data
US 2024/0075578 A1    Mar. 7, 2024

Related U.S. Application Data

(63) Continuation of application No. 17/756,446, filed as application No. PCT/IB2020/061088 on Nov. 24, 2020, now Pat. No. 11,850,695.

(Continued)

(51) Int. Cl.
B24B 57/04    (2006.01)
B05D 3/12    (2006.01)
(Continued)

(52) U.S. Cl.
CPC ............ B24B 27/0038 (2013.01); B05D 3/12 (2013.01); B05D 5/005 (2013.01); B24B 19/26 (2013.01);
(Continued)

(58) Field of Classification Search
CPC ... B24B 19/26; B24B 27/0038; B24B 41/002; B24B 41/005; B24B 51/00; B24B 57/04;
(Continued)

(56) References Cited

U.S. PATENT DOCUMENTS 4,294,357 A    10/1981 Stevens
5,231,803 A    8/1993 Lanzer
(Continued)

FOREIGN PATENT DOCUMENTS

CN    206316896    7/2017
EP    2463056 A2    6/2012
(Continued)

OTHER PUBLICATIONS

International Search Report for PCT Application No. PCT/IB2020/061088, mailed on Feb. 16, 2021, 5 pages.

*Primary Examiner* — Eileen P Morgan

(57) ABSTRACT

A disc changing system for a robotic defect repair system is presented. The system has a first abrasive disc and a second abrasive disc. The first and second abrasive discs are coupled to a liner. The system includes an abrasive disc placement device configured to automatically: remove the first abrasive disc from the liner, transport the first abrasive disc to a robotic tool of the robotic defect repair system, and place the first abrasive disc on a backup pad coupled to the robotic tool. The system also includes an abrasive disc remover configured to automatically remove the first abrasive disc after receiving a removal signal. The system also includes a controller configured to send an instruction to the (Continued)

disc placement device to remove, transport and place the first abrasive disc, instruct the robotic tool to conduct an abrasive operation. The controller is also configured to send the removal signal. The controller is a processor and the instructions are stored on a non-transitory computer-readable medium and executed by the processor.

20 Claims, 14 Drawing Sheets

Related U.S. Application Data

(60) Provisional application No. 62/940,960, filed on Nov. 27, 2019.

(51) Int. Cl.

| | | |
|---|---|---|
| *B05D 5/00* | (2006.01) | |
| *B24B 19/26* | (2006.01) | |
| *B24B 27/00* | (2006.01) | |
| *B24B 41/00* | (2006.01) | |
| *B24B 49/00* | (2012.01) | |
| *B24B 51/00* | (2006.01) | |
| *B24D 3/00* | (2006.01) | |
| *B24D 9/08* | (2006.01) | |
| *B24D 11/02* | (2006.01) | |
| *B25J 3/00* | (2006.01) | |
| *B25J 9/16* | (2006.01) | |
| *B25J 11/00* | (2006.01) | |
| *B25J 13/08* | (2006.01) | |
| *B25J 19/02* | (2006.01) | |

(52) U.S. Cl.
CPC ............ *B24B 41/005* (2013.01); *B24B 51/00* (2013.01); *B24B 57/04* (2013.01); *B24D 3/002* (2013.01); *B24D 9/085* (2013.01); *B24D 11/02* (2013.01); *B25J 3/00* (2013.01); *B25J 9/16* (2013.01); *B25J 11/0065* (2013.01); *B25J 13/08* (2013.01)

(58) Field of Classification Search
CPC ......... B24B 49/00; B24B 49/12; B05D 5/005; B24D 9/085; B24D 11/02; B25J 3/00; B25J 9/16; B25J 9/1656; B25J 11/0065; B25J 13/08; B25J 13/088; B25J 13/089; B25J 19/02; B25J 19/021; B25J 19/04
USPC .................. 451/5, 6, 11, 12, 59, 63, 278
See application file for complete search history.

(56) References Cited

U.S. PATENT DOCUMENTS

| | | | |
|---|---|---|---|
| 8,647,171 B2 * | 2/2014 | Duescher | B24B 37/107 |
| | | | 451/5 |
| 11,850,695 B2 * | 12/2023 | Nienaber | B05D 3/12 |
| 2003/0139836 A1 | 7/2003 | Matthews et al. | |
| 2011/0223837 A1 * | 9/2011 | Duescher | B24B 37/345 |
| | | | 451/28 |
| 2012/0142255 A1 | 6/2012 | Panergo | |
| 2015/0044948 A1 | 2/2015 | Kottbus | |
| 2019/0015201 A1 | 5/2019 | Naderer | |
| 2019/0262966 A1 | 8/2019 | Scafutto et al. | |
| 2020/0324393 A1 * | 10/2020 | Unnerstall | B24B 27/0038 |
| 2021/0276153 A1 * | 9/2021 | Hayashi | B24B 27/0038 |
| 2022/0143837 A1 * | 5/2022 | Naderer | B25J 19/0066 |
| 2022/0266422 A1 * | 8/2022 | Naderer | B24D 9/085 |
| 2022/0314442 A1 * | 10/2022 | Naderer | B25J 9/1628 |
| 2023/0158634 A1 * | 5/2023 | Su | B24B 57/04 |
| | | | 451/11 |

FOREIGN PATENT DOCUMENTS

| | | | |
|---|---|---|---|
| JP | S58-109272 A | | 6/1983 |
| JP | H03-98754 A | | 4/1991 |
| JP | H03-52060 U | | 5/1991 |
| JP | 2008-310404 | | 12/2008 |
| JP | 3171961 U | * | 11/2011 |
| WO | 2020044178 A1 | | 3/2020 |
| WO | WO-2021171154 A1 | * | 9/2021 ............ B24B 55/06 |

* cited by examiner

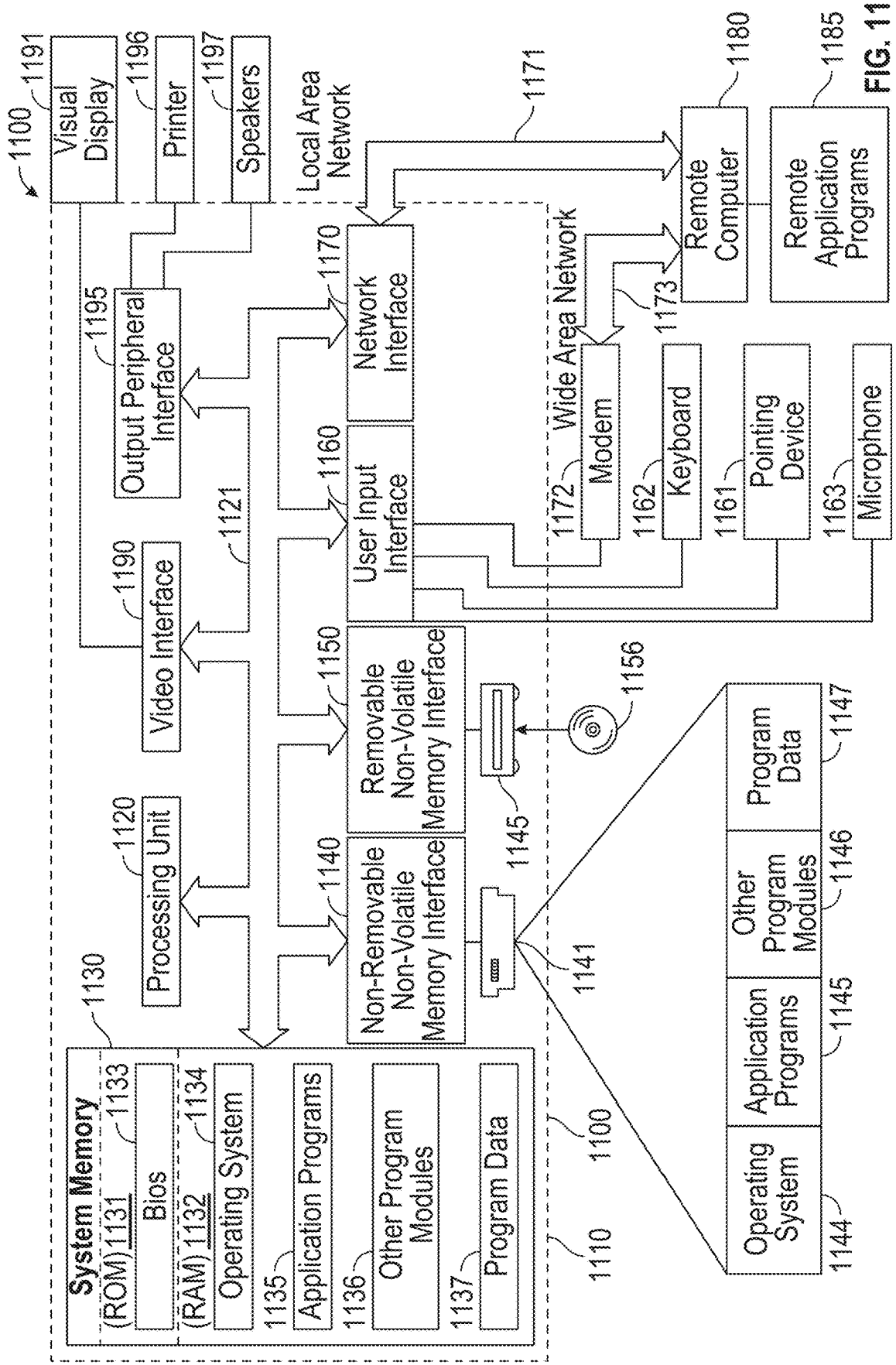

ns of U.S. application Ser.
ROBOTIC PAINT REPAIR

CROSS REFERENCE TO RELATED APPLICATIONS

This application is a continuation of U.S. application Ser. No. 17/756,446, filed May 22, 2022, which is a national stage filing under 35 U.S.C. 371 of PCT/IB2020/061088, filed Nov. 24, 2020, which claims the benefit of U.S. Provisional Application No. 62/940,960, filed Nov. 27, 2019, the disclosure of which is incorporated by reference in its/their entirety herein.

BACKGROUND

Clear coat repair is one of the last operations to be automated in the automotive original equipment manufacturing (OEM) sector. Techniques are desired for automating this process as well as other paint applications (e.g., primer sanding, clear coat defect removal, clear coat polishing, etc.) amenable to the use of abrasives and/or robotic inspection and repair.

Prior efforts to automate the detection and repair of paint defects include the system described in US Patent Publication No. 2003/0139836, which discloses the use of electronic imaging to detect and repair paint defects on a vehicle body. The system references the vehicle imaging data against vehicle CAD data to develop three-dimensional paint defect coordinates for each paint defect. The paint defect data and paint defect coordinates are used to develop a repair strategy for automated repair using a plurality of automated robots that perform a variety of tasks including sanding and polishing the paint defect.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 11 illustrates an example computing device which may be useful in embodiments described herein.

DETAILED DESCRIPTION

Recent advancements in computational power have made feasible the process of clear coat inspection at production speeds. In particular, stereo deflectometry has recently been shown to be capable of providing paint and clear coat defects at appropriate resolution with spatial information to allow subsequent automated spot repair.

Figure 1:
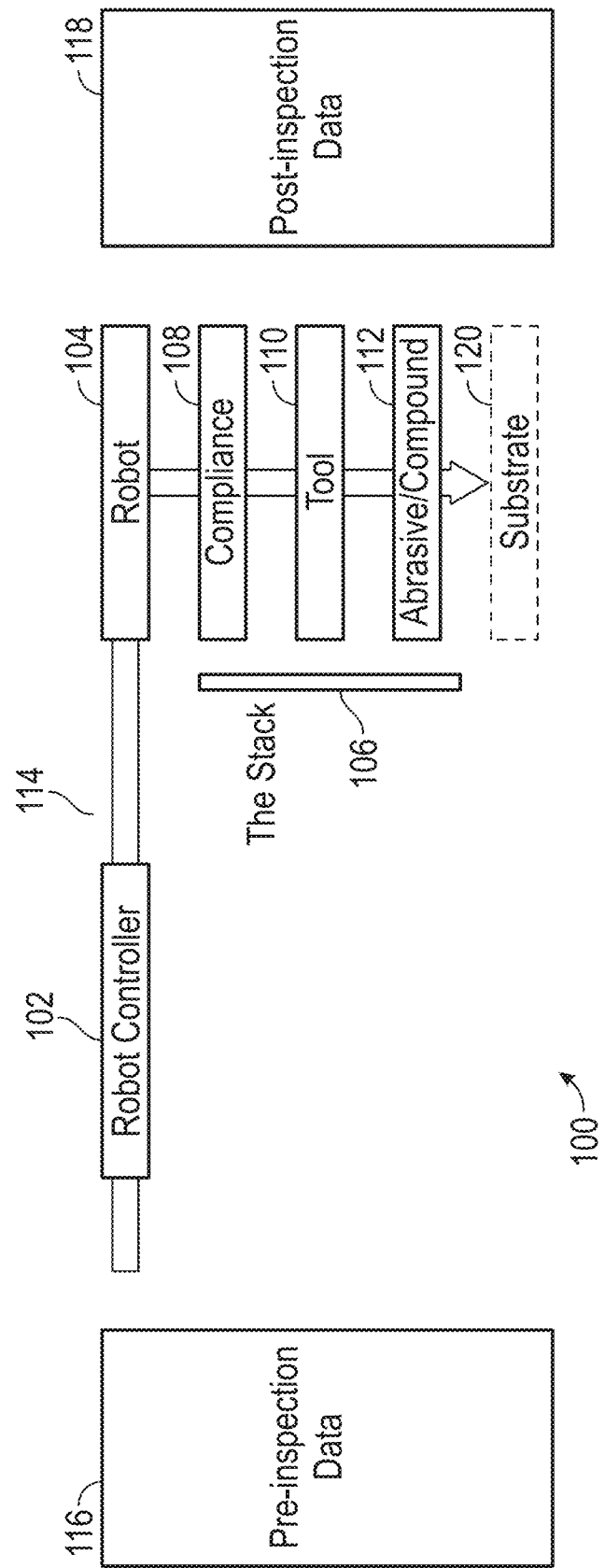
FIG. 1 is a robotic paint repair schematic in which embodiments of the present invention are useful.

FIG. 1 is a robotic paint repair schematic in which embodiments of the present invention are useful. In FIG. 1, the respective boxes represent various hardware components of the system including robot controller 102, robot manipulator 104, and robotic paint repair stack 106 including compliance force control unit 108, tooling 110, and abrasive articles/compounds 112. The flow of data is depicted by the background arrow 114 which starts with pre-inspection data module 116 that provides inspection data including identified defects in the substrate and ends with post-inspection defect data module 118 for processing data generated from the substrate 120 during the defect repair process.

Substrate 120 may be the car body itself, and the finish can be any state of the car throughout the entire manufacturing process. Typically, the car or panels of interest have been painted, clear-coated, and have seen some form of curing (e.g., baking) and are checked for defects. In operation, the defect locations and characteristics are fed from the pre-inspection data module 116 to the robot controller 102 that controls robot manipulator 104 on which a program guides an end effector (stack) 106 to the identified defect to execute some predetermined repair program (deterministic) policy. In some rare cases, the policy might be able to adapt depending on the provided defect characteristics.

For paint repair applications, the robotic paint repair stack 106 comprises abrasive tooling 110 and abrasive articles and compounds 112 along with any ancillary equipment such as (compliant) force control unit 108. As used herein, the robotic paint repair stack 106 is more or less synonymous with the term end effector; however, in this document the term "stack" is the end effector in the context of robotic paint repair. Also, though described for providing robotic paint repair, which includes repair of primer, paint, and clear coats, it will be appreciated that the techniques described herein lend themselves to other industrial applications beyond paint repair.

Figure 2:
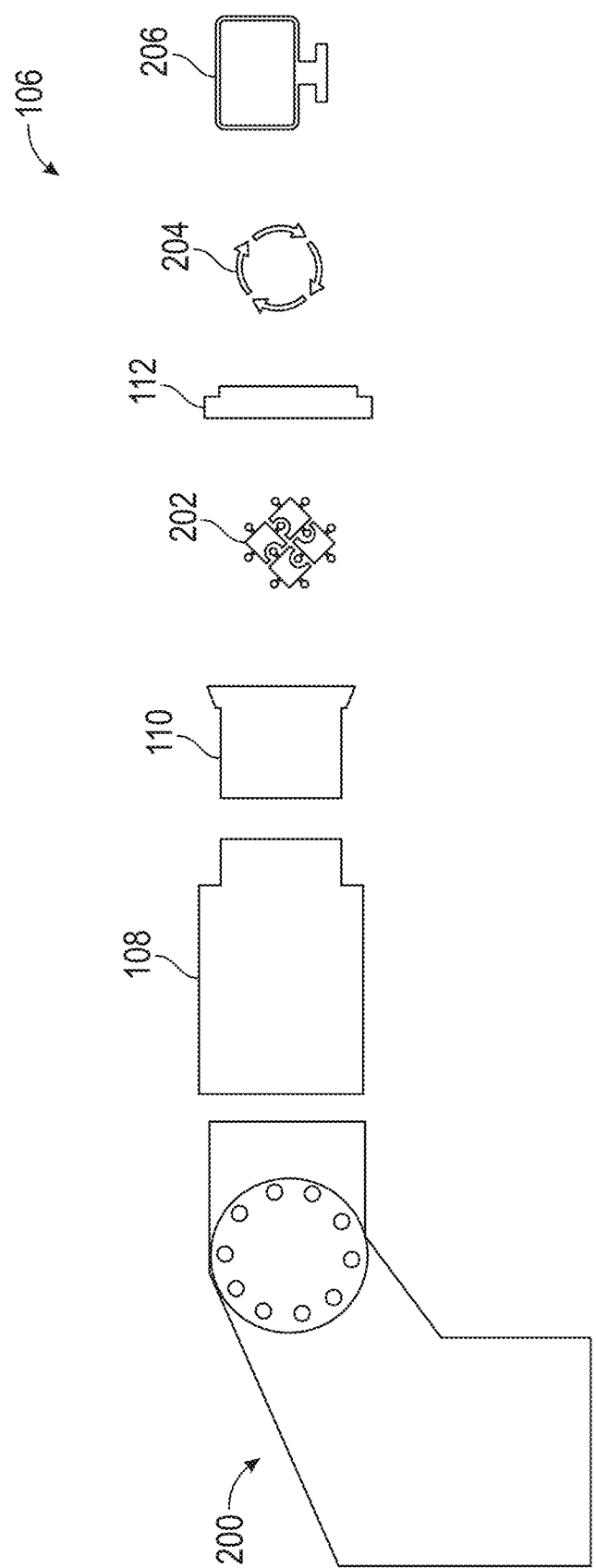
FIG. 2 illustrates an exploded view of the components of a robotic paint repair stack.

FIG. 2 illustrates an exploded view of the components of a robotic paint repair stack. As illustrated, the robotic paint repair stack 106 comprises a robot arm 200, force control sensors and devices 108, a grinding/polishing tool 110, a hardware integration device 202, abrasive pad(s) and compounds 112, a design abrasives process 204, and data and services 206. These elements may work together to identify defect locations and to implement a predetermined repair program using a deterministic policy for the identified defect, such as the policy discussed in co-owned and co-pending PCT Application No. PCT/IB2019/057053, filed on Aug. 21, 2019.

Figure 3:
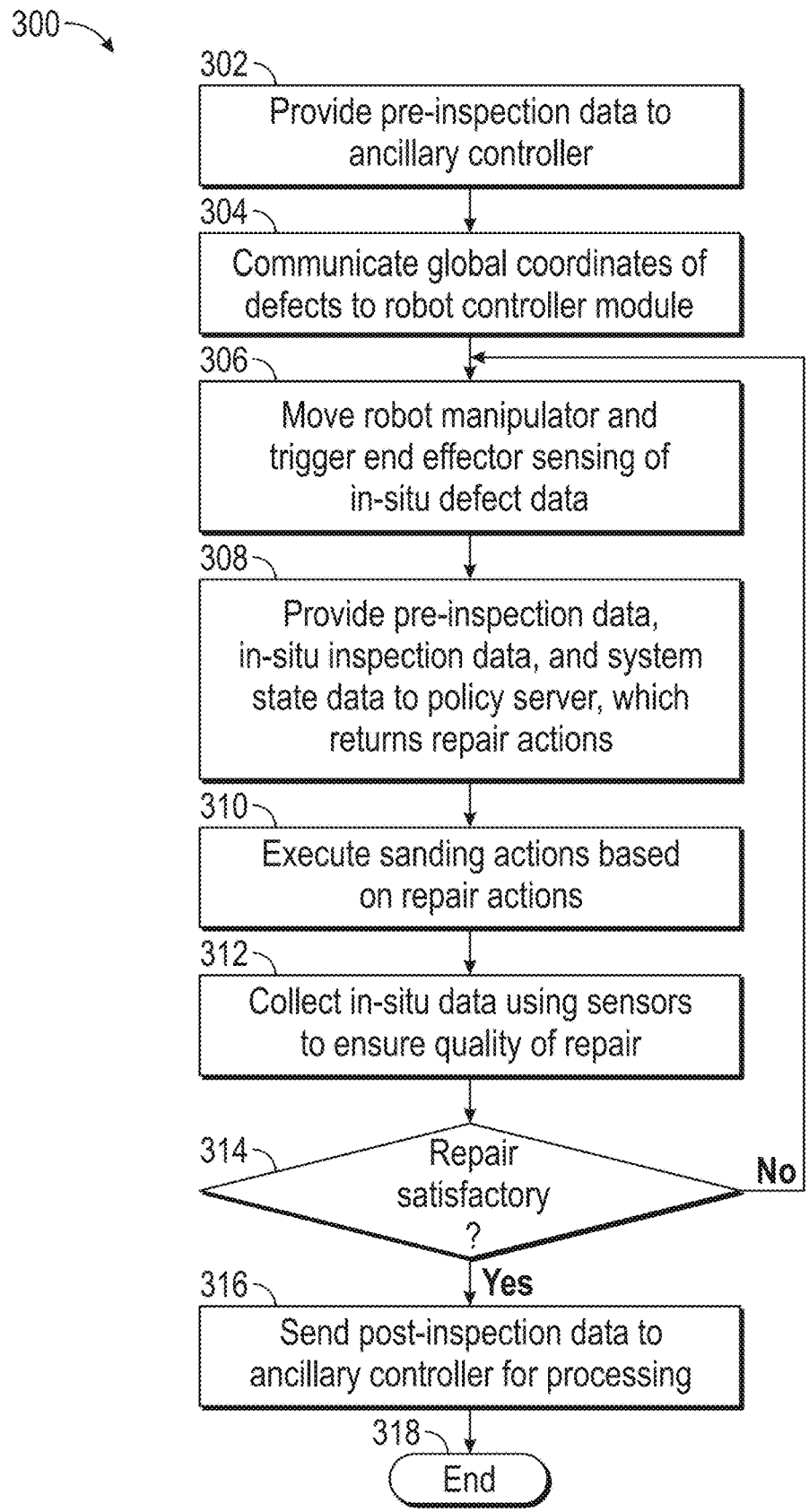
FIG. 3 illustrates a sample process flow of a robotic paint repair.

FIG. 3 illustrates a sample process flow of a robotic paint repair. Process flow 400 includes providing pre-inspection data to a robot controller from the from pre-inspection data module at 302. The pre-inspection data can include global, body-centric coordinates of each identified defect along with (optional) geometric data/profiles and/or classification of the defect itself. Global coordinates of the identified defects are communicated to the robot controller module at 304 along with any external axes such as conveyor belt position such that the robot manipulator can bring the end effector into close proximity to the identified defects in succession. If the optional local defect information and/or classification was provided, this can be used to select defects to process or skip. Then, the ancillary controller module in conjunction with the robot controller module move the robot manipulator and trigger end effector sensing by sensors at 306 to take in-situ local defect inspection data using local uncalibrated deflectometry information.

At 308, the pre-inspection data, in-situ inspection data, and current state of the system (e.g., loaded abrasive/compound, abrasive life, current tooling, etc.) is transferred to the policy server in the cloud computing system, which takes all of the inspection data and current system state and returns repair actions using a previously learned control policy. Returned sanding actions (step one of two-part repair) from the learned policy are then executed at 310 by the ancillary controller through simultaneous communication with the robot controller module and end effector stack. Actions in this example include set points for tool RPM, pressure (control input into compliant force flange), robot trajectory, and total processing time. In on embodiment, the robot trajectory is communicated as time-varying positional offsets from the defects origin. In-situ data is collected using sensors to ensure quality of repair.

If it is determined at 314 that the repairs are not satisfactory, steps 306-312 may be repeated until the repair is deemed satisfactory, but such iterations are not needed in the case of an optimal repair policy execution. Steps 306-314 also may be repeated for buffing commands (step two of two-part repair) returned from the policy server in the cloud computing system.

Finally, post-inspection data is collected by the post-inspection data module on final quality of repair at 316 and the post-inspection data is sent to the ancillary controller for processing. All data (pre-inspection, in-situ, and post-inspection) is sent to the policy server in the cloud computing system for logging and for learning updates. The process then ends at 318.

As automation of defect repair continues, robotic components performing automated repairs will also see improvement. Described herein are several different embodiments of robotic components, systems and methods for improved defect repair operations. Embodiments described herein can be implemented separately or as a combination.

Figure 4:
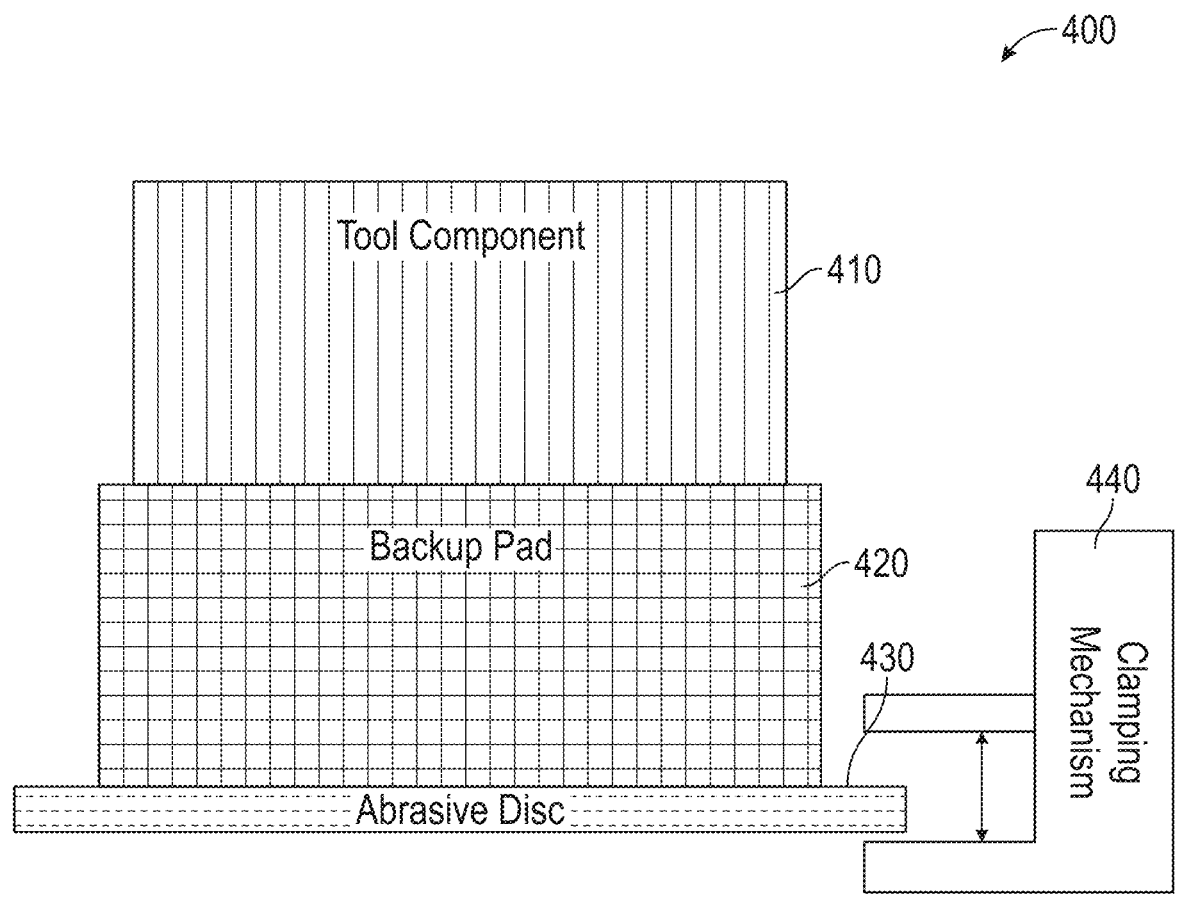
FIG. 4 illustrates an abrasive disc attachment system an embodiment of a robotic repair system.

FIG. 4 illustrates an abrasive disc attachment system an embodiment of a robotic repair system. Attachment system 400 includes a tool component 410 configured to attach to a motive robotic unit, such as an end effector or robot tool 110 of FIG. 1, for example. Tool component 410 may include a spindle or other attachment component that can receive backup pad 420. Backup pad 420 provides support for an attached abrasive disc 430. Support can include physical support to ensure that attached abrasive disc 430 contacts a work surface with sufficient force. Backup pad 420 may also include a hole pattern to facilitate dust extraction during a sanding process. Backup pad 420 may be stiff or flexible, depending on a given operation.

Abrasive disc 430 may couple to backup pad 420 using any suitable non-permanent attachment mechanism. For example, an adhesive may be applied, including a pressure-sensor adhesive, in one embodiment. A hook and loop attachment may also be used, with either the hook or the loop portion on the non-abrasive side of abrasive disc 430.

Abrasive disc 430, in one embodiment, is a coated abrasive disc including a backing with a plurality of abrasive grains embedded within a make coat and optionally coated with a size coat and/or a super-size coat. The backing substrate can be any of fabric, open-weave cloth, knitted fabric, porous cloth, loop materials, unsealed fabrics, open or closed cell foams, a nonwoven fabric, a spun fiber, a film, a perforated film or any other suitable backing material. A fabric backing may include cloth (e.g., cloth made from fibers or yarns comprising polyester, nylon, silk, cotton, and/or rayon, which may be woven, knit or stitch bonded) or scrim. The abrasive grains may include shaped abrasive grains, crushed abrasive grains, or platey shaped abrasive grains. The size of the abrasive grains may be selected based on the aggressiveness of the repair operation to be completed. Abrasive disc 430 may be a stiff or flexible abrasive disc.

As illustrated in FIG. 4, in one embodiment, at least a portion of abrasive disc 430 extends beyond an edge of backup pad 420. In one embodiment, both back-up pad 420 and abrasive disc 430 are circular in shape, with abrasive disc 430 having a larger diameter than backup pad 420. However, other configurations are expressly contemplated. For example, abrasive disc 430 may have one or more protrusions or tabs that extend beyond an edge of backup pad 420. In another embodiment, abrasive discs 430 are not circular in shape and include at least one corner that extends beyond an edge of back-up pad 420. For example, abrasive 'discs' 430 are actually square, triangular, or rectangular in shape. Other suitable shapes are also possible.

Abrasive disc 430 is sized such that it can be easily removed from backup pad 420. For example, as illustrated in FIG. 4, a removal mechanism 440, such as a clamp, can grab a protruding portion of abrasive disc 430 and facilitate removal.

Figure 5:
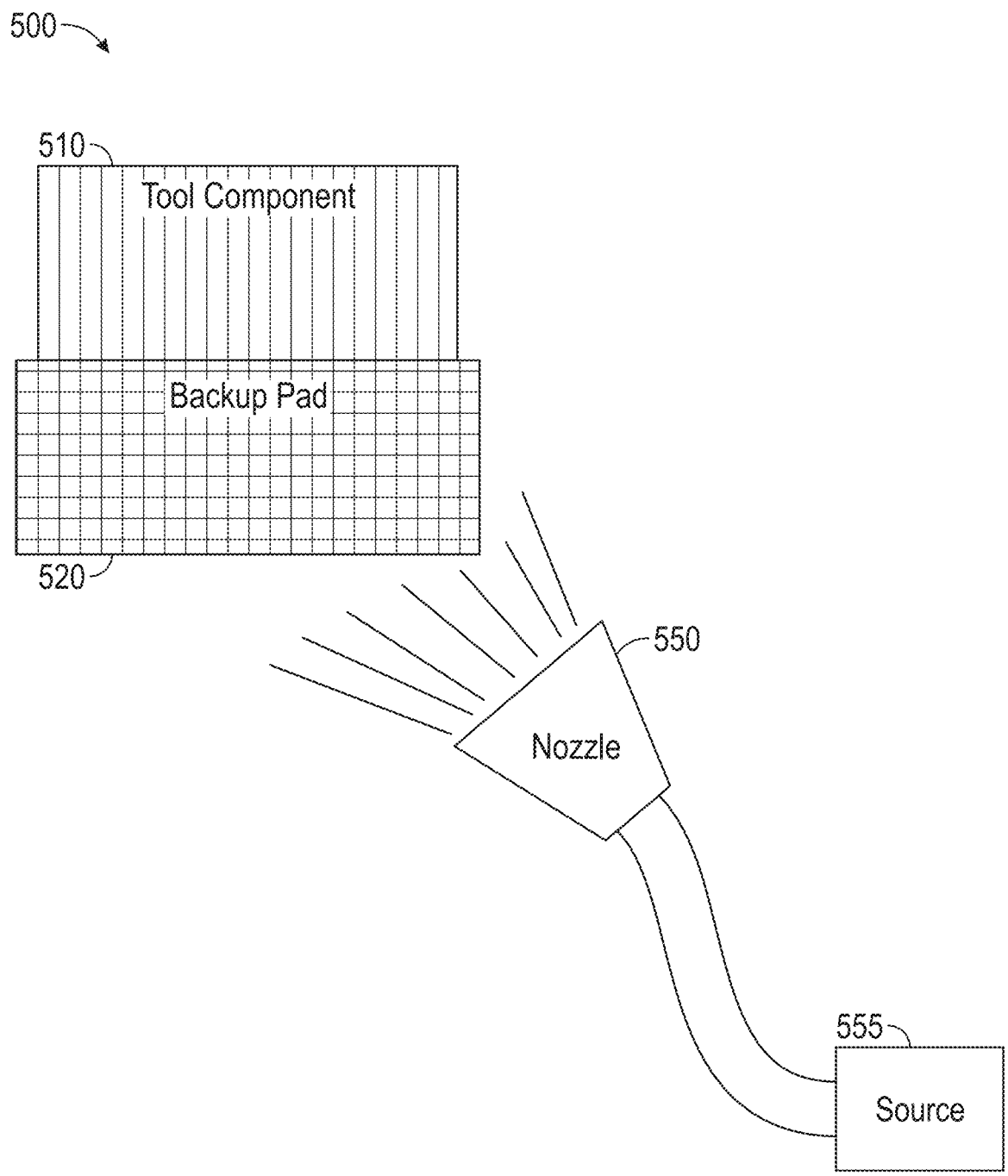
FIG. 5 illustrates a cleaning system for an abrasive disc attachment system in an embodiment of a robotic repair system.

FIG. 5 illustrates a cleaning system for an abrasive disc attachment system in an embodiment of a robotic repair system. System 500 may be similar to system 400, for example with a used abrasive disc 430 having been removed.

When abrasive discs are worn out and changed, they are removed from a backup pad, which can often be reused several times prior to being discarded. Abrasive discs can be used in conjunction with fluid, such as water or polish, when abrading a workpiece. After an abrasive disc is removed, at least some of the fluid may remain on backup pad 520. A cleaning cycle may improve adhesion of a newly applied abrasive disc. Nozzle 550 provides fluid flow from a fluid source 555 onto backup pad 520. Fluid flow, in one embodiment, is air flow from a source of pressurized air. The air flow is strong enough to remove residual water droplets. In one embodiment, the air flow is between 10 and 120 psi, or between 20 and 100 psi. In another embodiment, fluid flow includes water intended to dislodge particulates.

While nozzle 550 is illustrated in FIG. 5 as being used on backup pad 520, it is also contemplated that nozzle 550 could also be used to remove particulates or water droplets from an abrasive disc attached to backup pad 520. For example, abrasive discs can be used with polish, which may dry or otherwise clog the abrasive particles, such that abrading is less efficient. Additionally, swarf, or material removed from a work surface, may clog the abrasive particles, reducing abrading efficiency.

FIGS. 6A-6D illustrate views of an embodiment of an abrasive disc dispensing system. Abrasive disc dispensing system 600 includes components separated into a robot cell 604 and components in an area 606 accessible to a human operator. The separating component 602 allows for an operator to replace materials consumed while robotic repair is ongoing within robot cell 604.

A roll of abrasive material 610 is mounted within system 600. Roll 610 includes, in one embodiment, removable abrasive material discs on a backing, which is then coupled to a liner. In one embodiment, the removable abrasive material discs include an adhesive layer which removeably couples to the liner and removeably couples to a backup pad.

However, other coupling mechanisms are expressly contemplated. The liner, with the abrasive discs, passes through system 600, around one or more tension rods 612, before passing through separating component 602. A path 614 illustrating movement of abrasive material through system 600 is shown in FIGS. 6B and 6C.

Figure 6A:
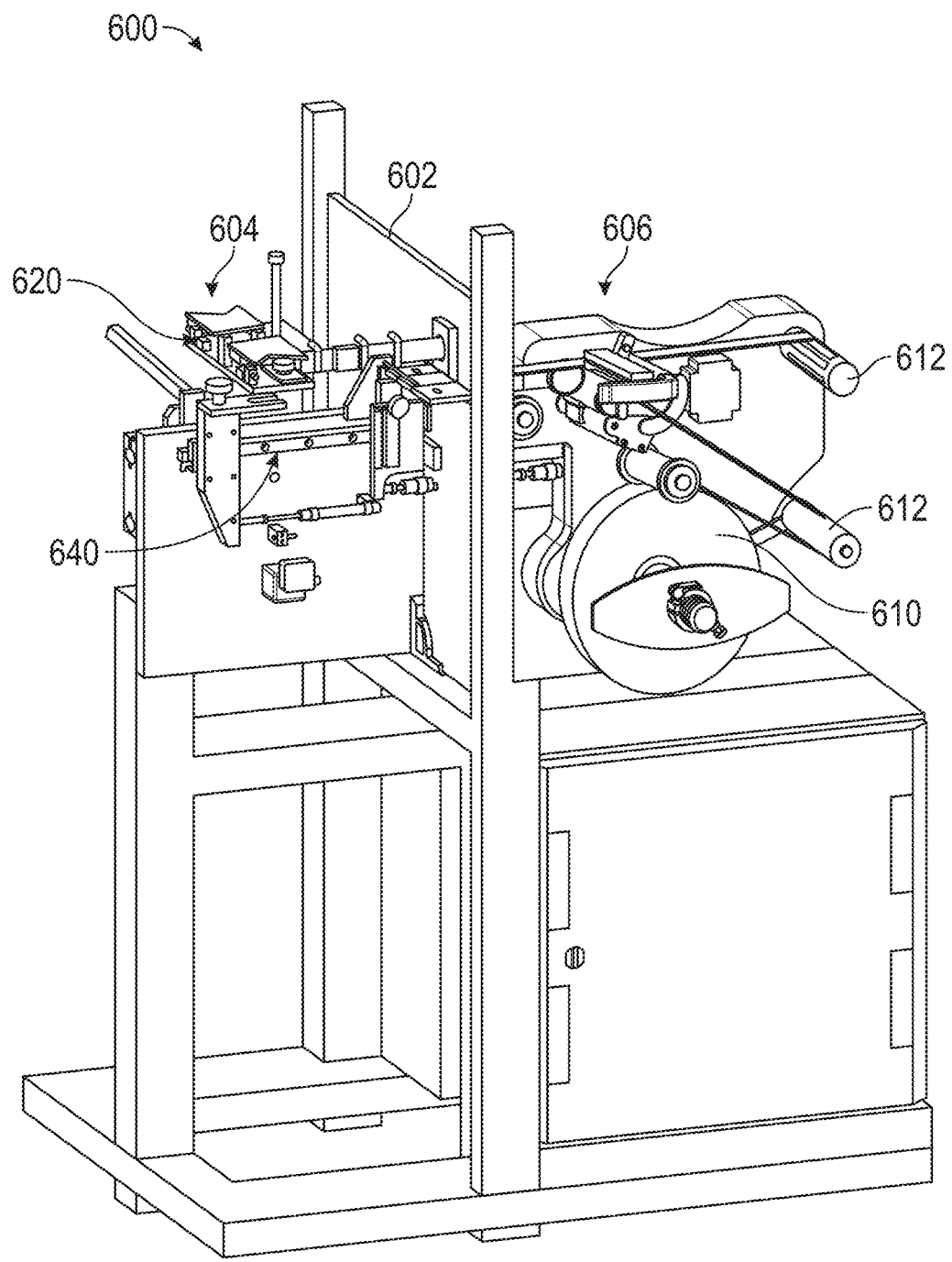
FIGS. 6A-6D illustrate views of an embodiment of an abrasive disc dispensing system.
Figure 6B:
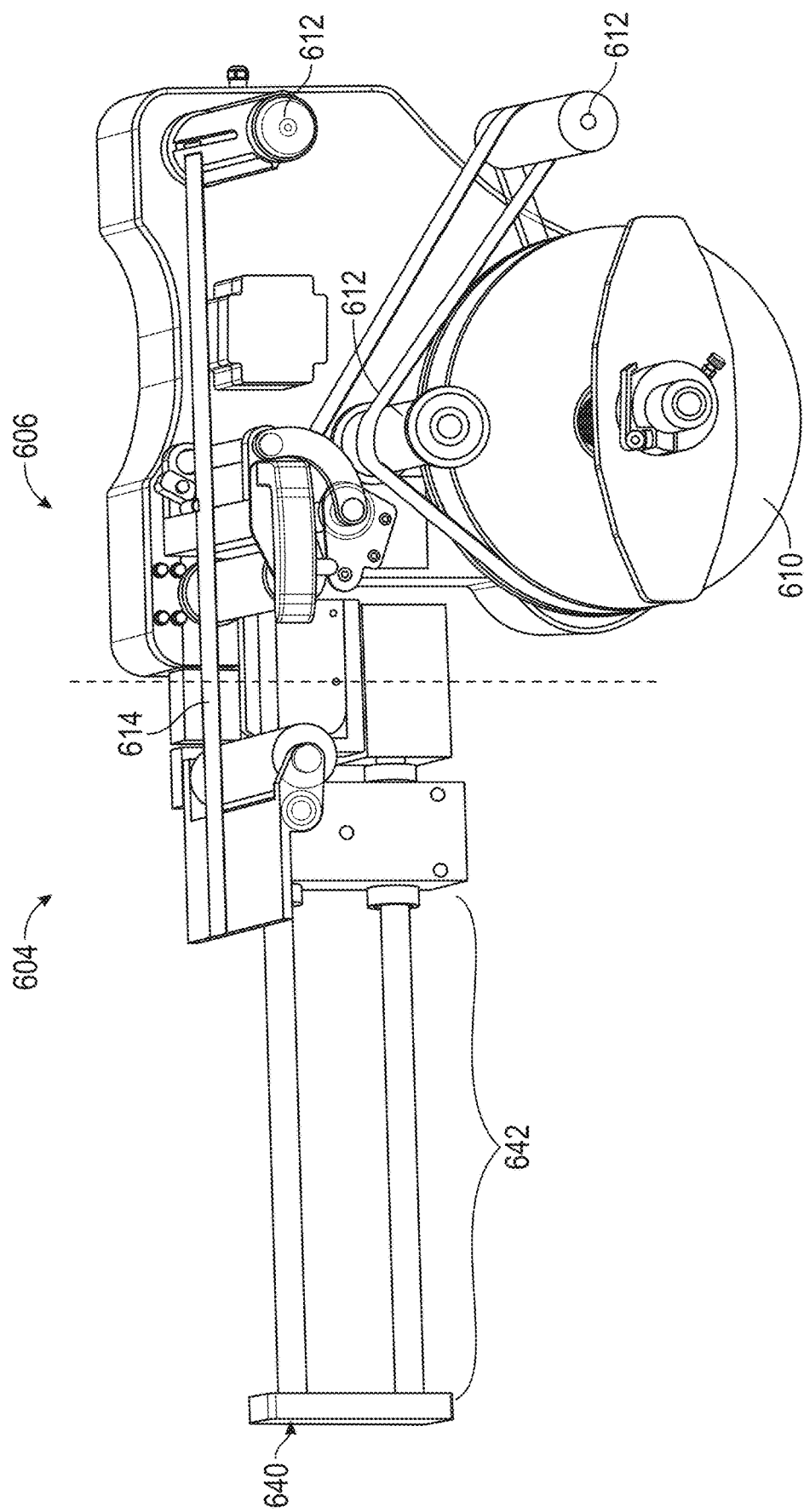
Figure 6C:
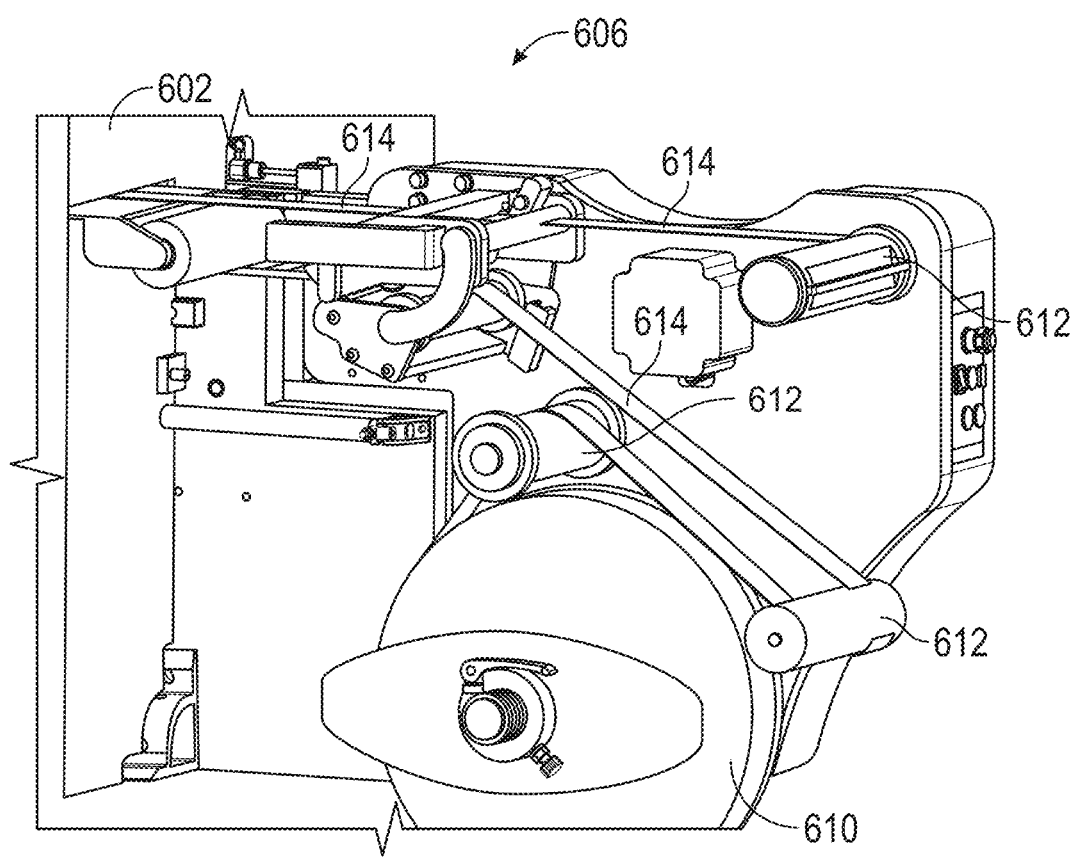

The abrasive discs are removed from the backing and provided to a transfer mechanism 640, illustrated in FIG. 6B. Transfer mechanism 640 transfers an abrasive disc from system 600 to an application area, such as the backup pad described in FIGS. 4 and 5.

Figure 6D:
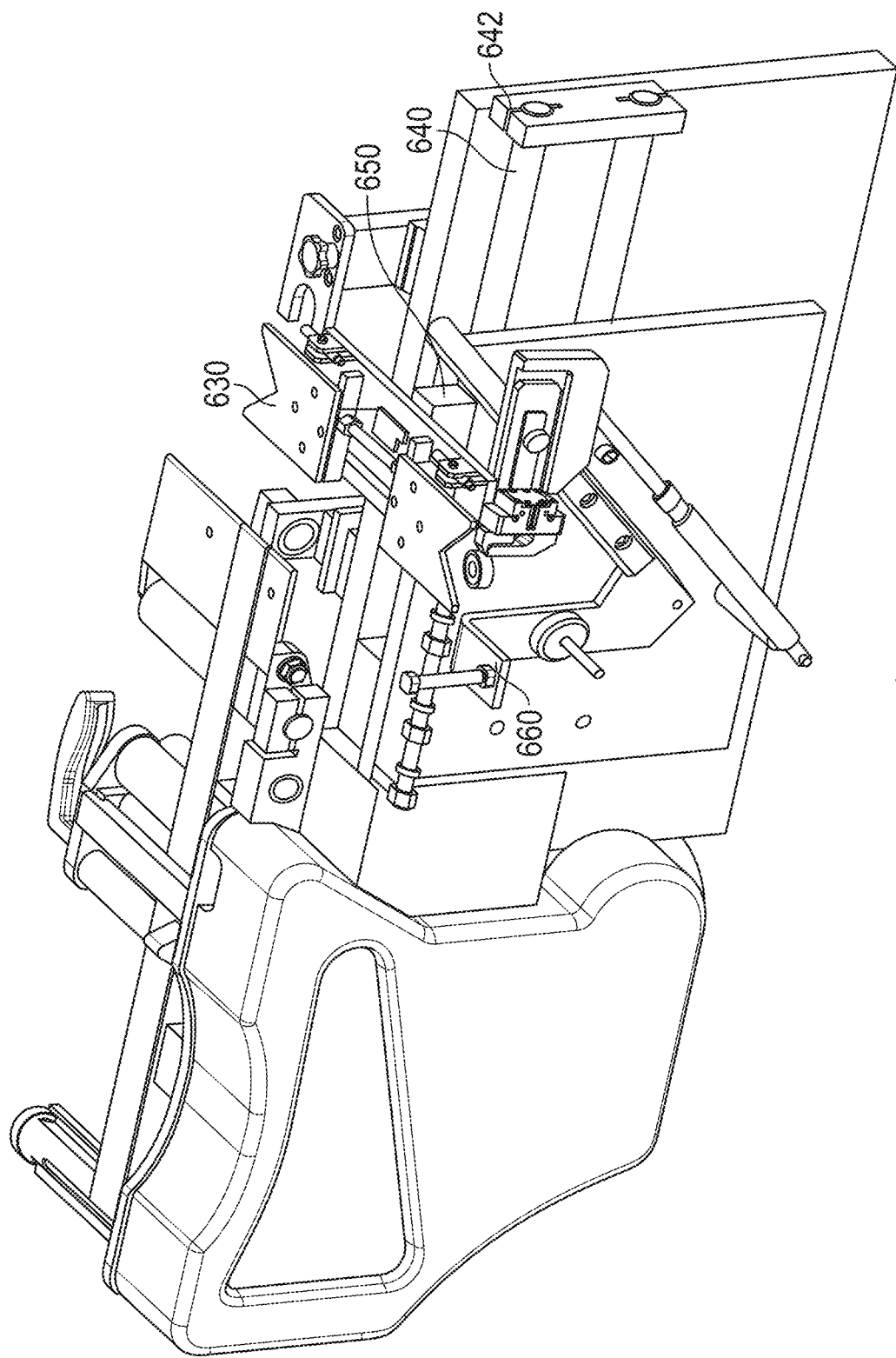

A disc detachment system 650 is illustrated in FIG. 6D. Abrasive discs are centered, using centering unit 630, before being detached and provided to transfer mechanism 640. As illustrated in FIG. 6D, transfer mechanism 640 has a transfer guide 640 that receives the abrasive disc from system 600.

System 600 may also have a pullout module 660, in one embodiment. Pullout module 660 allows an operator to work on the roll and threadup path outside of the robotic cell without stopping production inside of the cell, for example.

Figure 7A:
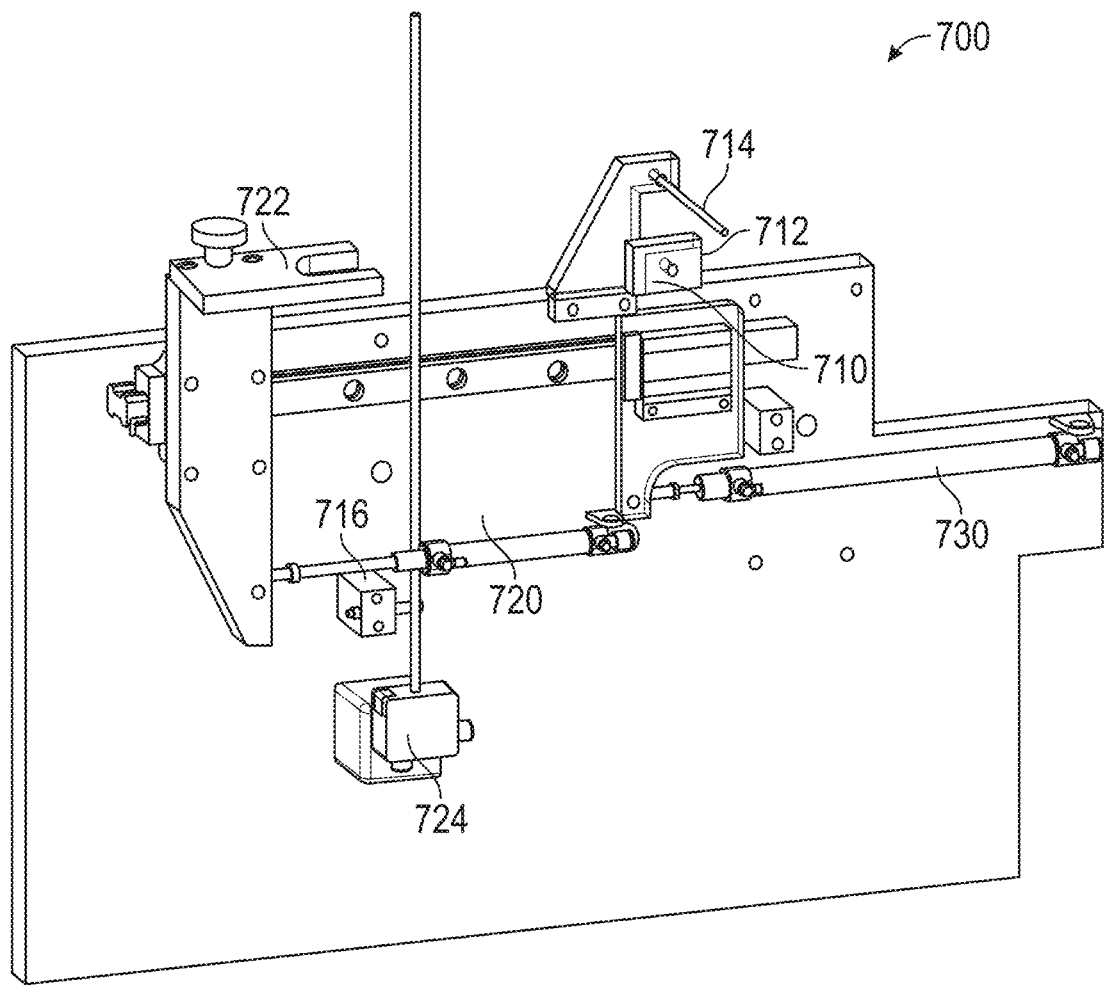
FIGS. 7A-7B illustrate views of components of an embodiment of an abrasive disc dispensing system.
Figure 7B:
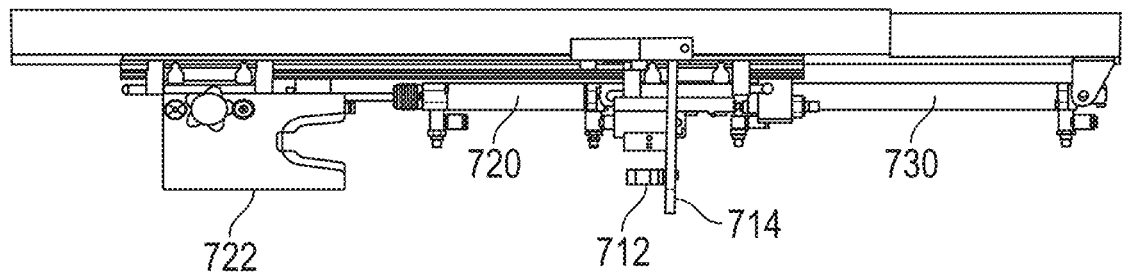

FIGS. 7A-7B illustrate views of components of an embodiment of an abrasive disc dispensing system. FIG. 7A illustrates a separation system 700, that may be a component of an abrasive disc dispensing system, such as system 600, for example. FIG. 7B illustrates a top view of system 700.

System 700 includes a disc centering cylinder 720 and a disc centering component 722 that ensure that ensure an abrasive disc is centered. The abrasive disc is transferred from its backing by a separation force. The separation force may include peeling the backing at a rate or angle that forces the abrasive disc to separate. This can be accomplished using a breaker bar, for example. The breaker bar should have a small enough radius such that at least an initial peel of the disc away from the liner is achieved. The separation force can also be a suction force, provided by a suction module 712, which pulls a vacuum against the backing. Alternatively, suction module 712 is intended to maintain a position of a disc with respect to a catch plate, and does not substantially contribute to removal of the disc from the liner. The separation force can also be a blowing force, such as air blowing from blower 714. These different separation forces can be used separately, or in combination to improve separation.

Figure 8B:
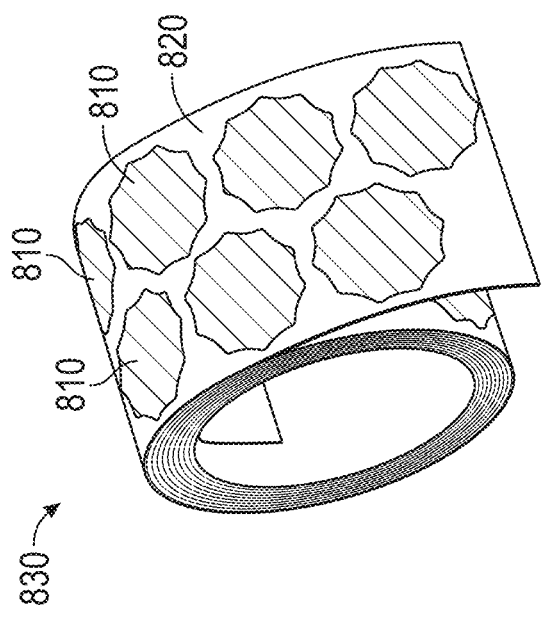
FIGS. 8A-8C illustrate rolls of abrasive material.
Figure 8C:
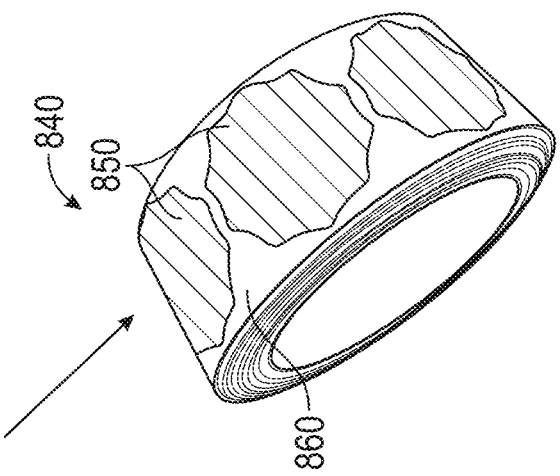
Figure 8A:
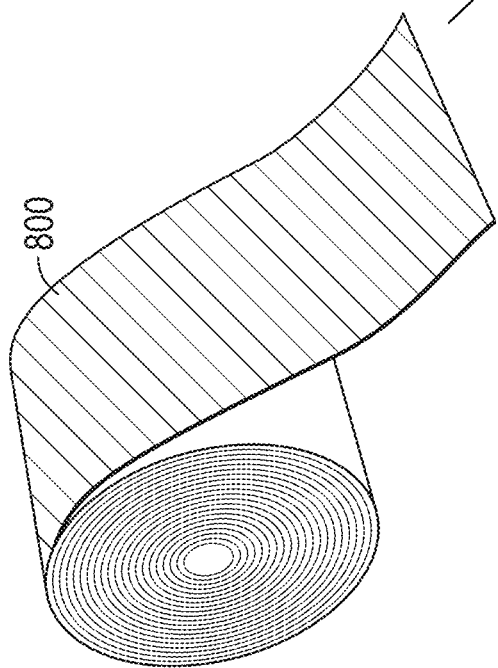

FIGS. 8A-8C illustrate rolls of abrasive material. FIG. 8A illustrates a roll of backing 800 coated with abrasive material. Generally, abrasive material is coated onto a backing such that abrasive particles are embedded within a make coat and then coated with an additional optional size and/or supersize coating. The entire backing 800 is usually coated evenly, as illustrated in FIG. 800. However, backing 800 often needs to be cut or segmented into suitable shapes for use in abrasive operations. The cutting is often accomplished with a laser that outlines the desired abrasive disc shapes 810. Abrasive disc shapes 810 are usually aligned in order to minimize waste, as the abrasive material outside of the abrasive shapes 810 is removed and discarded. Industry standard for manual abrasive applications is a dual-roll 830 of abrasive discs. Dual roll 830 has a reduced amount of waste, per disc produced, as compared a single-roll 840. For example, depending on the size of the abrasive disc on the liner, using a dual roll design may result in 10-40% reduced waste.

However, while single-roll 840 costs more to produce in terms of wasted abrasive material, single-roll 840 presents significant advantages over a dual-roll design. The simplicity of a single-roll system allows for easier alignment of the roll of abrasive discs within a disc dispensing system, such as that described with respect to FIGS. 6 and 7, for example.

Figure 9:
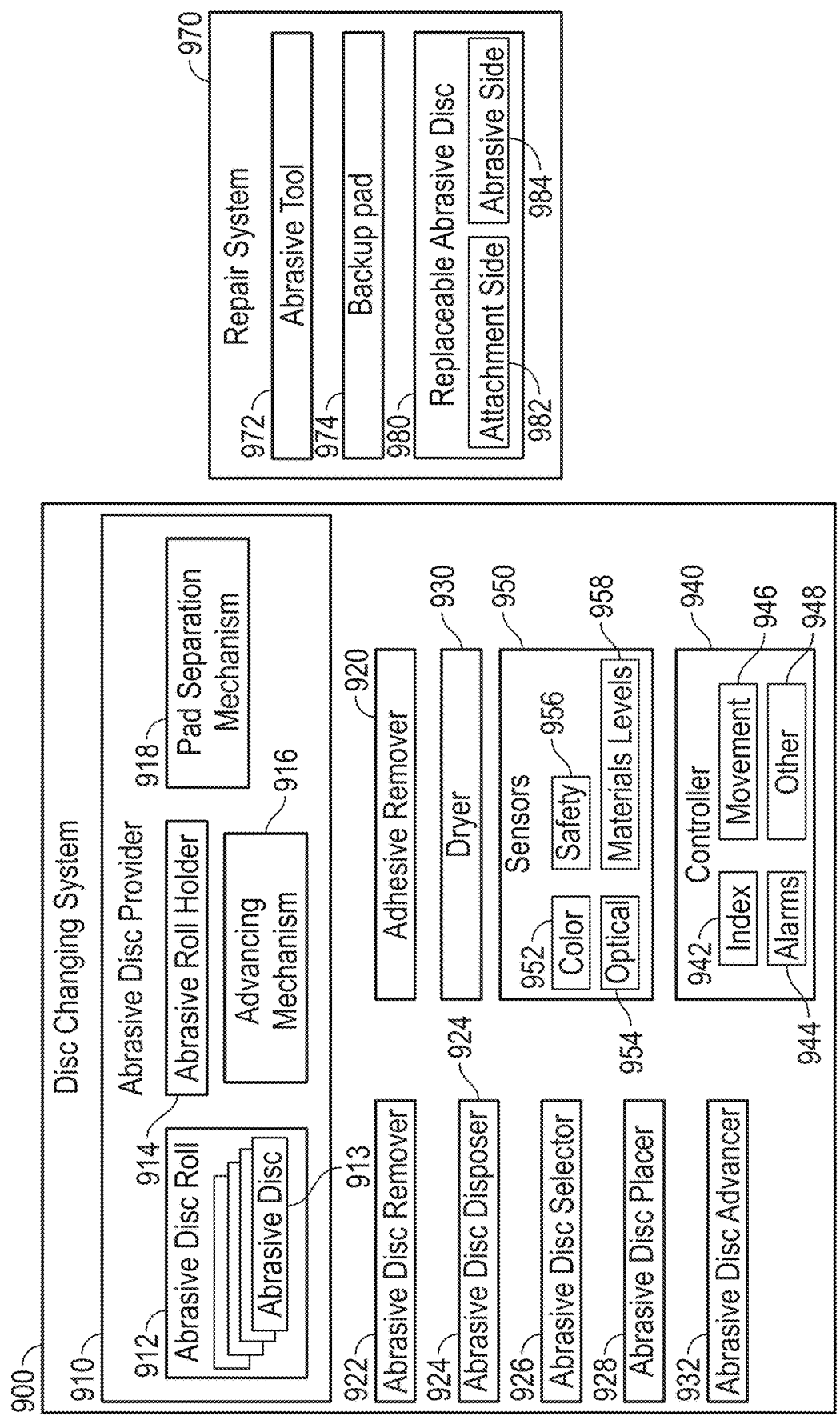
FIG. 9 illustrates a block diagram of an embodiment of a disc changing system.

FIG. 9 illustrates a block diagram of an embodiment of a disc changing system. Disc changing system 900 includes a provider 910 of abrasive discs 913. Abrasive discs 913 may circular in shape, or any other suitable shape, such as square, rectangle. Abrasive discs 913 may also have edge detailing, such as scallops, protrusions, or tabs.

A defect repair system 970 includes an abrasive tool 972 which couples to a backup pad 974. Backup pad 974 is configured to removably couple to a replaceable abrasive disc 980. Abrasive disc 980 may be replaced by one or more of abrasive discs 913. Abrasive disc 980 has an abrasive side 984, comprising abrasive particles fixed to a backing. Abrasive disc 980 also has an attachment side for coupling to backup pad 974. Ideally, attachment side 982 includes removable attachment mechanisms for coupling to backup pad 974, however permanent attachment mechanisms are also contemplated. However, it is desired, for cost efficiency, to reuse backup pad 974 for the duration of several abrasive discs 913 prior to discarding it. Attachment side 982 can include adhesive, such as pressure-sensitive adhesive. Alternatively, attachment side 982 can include a mechanical attachment mechanism, such as either the 'hook' or 'loop' portion of a hook and loop attachment system.

When replaceable abrasive disc 980 experiences wear on abrasive side 984, it can be replaced, using disc changing system 900, for example. One or more of abrasive discs 913 may be applied to backup pad 974, in succession.

Abrasive discs 913 are stored on an abrasive disc roll 912 prior to dispensing and application to back-up pad 974. Abrasive roll 912 includes a liner to which abrasive discs 913 are attached. Abrasive roll 912 is supported by an abrasive roll holder 914. Holder 914 may include one or more tension rods that keep the liner under tension. An advancing mechanism 916 advances each abrasive disc 913 forward as each one is sequentially dispensed. The advancing mechanism 916 may be a roller that rotationally advances abrasive disc roll 912, in one embodiment. In another embodiment, the advancing mechanism is a pulling or pushing force acting on the liner, causing roll 912 to rotate and make additional abrasive discs 913 available.

An abrasive disc remover 922 retrieves replaceable abrasive disc 980 from abrasive tool 972. Abrasive disc remover 922 may include a clamp, in one embodiment, configured to interact with a portion of replaceable abrasive disk 980 that extends beyond a surface of back-up pad 974. In one embodiment, abrasive discs 980, 913 have a diameter larger than that of backup pad 974. In another embodiment, abrasive discs 980, 913 have features that extend beyond a footprint of backup pad 974, such as tabs, protrusions, scalloping, or other suitable features that allow for abrasive disc remover 922 to remove abrasive discs 980, 913 from backup pad 974. In one embodiment, removing abrasive disc 980 includes peeling abrasive disc 980 off of backup pad 974. In another embodiment, removing abrasive disc 980 includes detaching abrasive disc 980 form backup pad 974, such as decoupling a hook and loop system.

Removed abrasive disc 980 is discarded by abrasive disc disposer 924. Abrasive disc disposer, in one embodiment, is part of abrasive disc remover 922, such that a single component removes and discards a used abrasive disc 980.

A separation mechanism 918 separates each abrasive disc 913 from the liner. Separation mechanism 918 may include a breaker bar configured to cause an abrasive disc 913 to peel at least partly away from the liner as the liner is rolled around the breaker bar. Separation mechanism 918 may also include a blower that blows air at an edge and/or an underside of an abrasive disc 913, causing disc 913 to peel at least partly away from the liner. Separation mechanism 918 may also include a suction mechanism that may allow to either the liner or to abrasive disc 913, causing abrasive disc 913 to peel away from liner 913.

Disc changing system 900 includes an abrasive disc selector 926. Abrasive disc selector 926 may include a clamp or a surface that interacts with an underside of abrasive disc 913. Abrasive disc selector 926 may facilitate peeling of abrasive disc 913 away from the liner by pulling abrasive disc 913 as the liner is further advanced through disc changing system 900. Abrasive disc selector 926, in one embodiment, selects abrasive disc 913 in a specific orientation. In one embodiment, abrasive disc provider 910 includes an alignment component that is configured to keep abrasive discs 913, on the liner, within a given path, such that abrasive disc selector 926 retrieves each successive disc 913 in a similar manner. For example, an alignment component may keep a 1" wide liner within a 1.2" path.

An abrasive disc placer 928 may place abrasive disc 913 on back-up pad 974. Abrasive disc placer 928 may be the same component as abrasive disc selector 926, in one embodiment, such that the abrasive disc selector 926 retrieves abrasive disc 913 and places it on backup pad 974 in a single operation. In one embodiment, abrasive disc remover 922, disposer 924, selector 926, and placer 928 are all one component, such that replaceable disc 980 is removed and discarded by the same tool that then selects and places abrasive disc 913.

Abrasive disc advancer 932 advances abrasive disc roll 912, such that each time abrasive disc selector 926 retrieves one abrasive disc 913, a new abrasive disc 913 is prepared for retrieval.

Disc changing system 900 includes a cleaner 920, in one embodiment, configured to interact with back-up pad 974 and/or replaceable abrasive disc 980. In embodiments where attachment side 982 includes adhesive, built up adhesive may need to be removed from back-up pad over time. Cleaner 920 may include cleaning fluid, a mechanical cleaning agent, such as a brush, or both. Cleaner 920 may also interact with replaceable abrasive disc 980, to increase abrading efficiency by removing built up swarf or built up polishing material.

Disc changing system 900 may also include a dryer 930, which may dispense air onto backup pad 974 to dislodge water droplets, such that a new abrasive disc 913 can better couple to backup pad 974.

Disc changing system 900 may also include a variety of sensors 950. Sensors 950 may include sensors to indicate when material levels 958 are low, for example such that an operator can replace a near empty abrasive disc roll 912. Additionally, sensors 950 may indicate that a source of polish, water or air is low or malfunctioning. Sensors 950 may also include safety sensors 956, which may indicate when an unsafe situation is present, or which may cause the system 900 to undergo an emergency stop. For example, if an operator is inside a robot cell portion of a disc changing system.

Sensors 950 may also be used to detect whether abrasive discs 913 have transferred as expected. For example, a color sensor 952 may detect a color on backup pad 974. If backup pad 974 has a black color, color sensor 952 can report that an abrasive disc 980 has been removed when a detected color changes to black. Abrasive discs 913 may come in a variety of colors, including gray, blue, and other suitable colors. Color sensors 952 can detect a color of a replaceable abrasive disc 980 coupled to backup pad 974. Color sensors 952 may stop operation of repair system 970 if an improper disc color is detected. For example, colors of abrasive discs 913 may be indicative of brand, grade, or other function of an abrasive disc 913. If the wrong color is detected, damage may be done to a work surface, if the grade is higher than anticipated, or a defect may not be repaired, if the grade is lower than anticipated. In addition to color sensors 952, other optical sensors 954 may also be suitable.

A controller 940 is associated with disc changing system 900 and is configured to send movement commands 946 to each of the components of disc changing system, where the commands include an instruction to perform an operation and a time to perform the operation. The instructions may also include telemetry for a moving component, for example such that disc placer 928 moves far enough to place an abrasive disc 913 on backup pad 974.

Controller 940 may also update an index 942 each time an abrasive disc 913 is removed. Indexing 942 may involve advancing abrasive disc roll 912 such that the next abrasive disc 913 is ready. Controller 940 also controls alarms 944, which may be triggered when certain criteria are met. For example, when abrasive disc roll 912 is almost out of abrasive discs 913, an alarm may go off indicating to an operator that a new roll 912 is needed. Alarms may be visual, audio, or another suitable media. Controller 940 may also be responsible for commands for other functionality 948. For example, in one embodiment, controller 940 controls both disc changing system 900 and repair system 970. In another embodiment, repair system 970 has a separate control system (not shown in FIG. 9).

Figure 10:
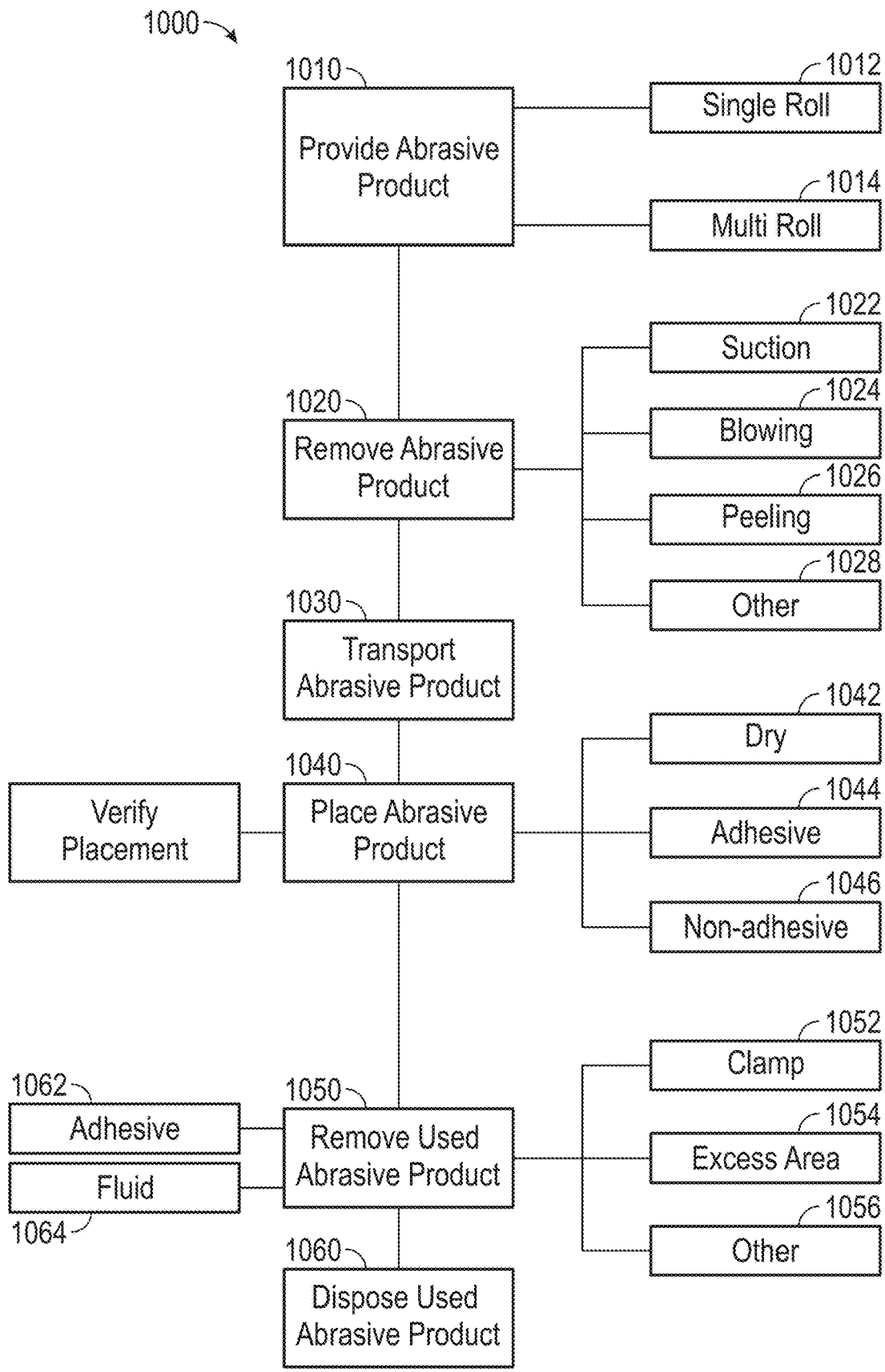
FIG. 10 illustrates an embodiment of a method of using a disc changing system.

FIG. 10 illustrates an embodiment of a method of using a disc changing system. Method 1100 may be useful with the systems described above but is not limited to the exact configurations of disc changing systems described above.

In block 1010, abrasive product is provided. The abrasive product may be provided as a single roll of abrasive product, as indicated in block 1012. Alternatively, the abrasive product may be provided as a multi-roll of abrasive product, as indicated in block 1014, and discussed with respect to FIG. 8 above. Abrasive product may include a roll of abrasive discs spaced on a liner, each disc being removable from the liner and attachable to a robotic tool. However, while the term 'disc' is used, it is expressly contemplated that abrasive product provided in block 1010 can come in other shapes. For example, a square, rectangle or triangle shaped abrasive product can be used, as well as other suitable polygonal shapes. Additionally, the abrasive product may have scalloped edges, or one or more protrusions extending along an edge.

In block 1020, abrasive product is removed, for example from a liner. Removal may include application of a force such as a suction force 1022, a blowing force 1024. These forces may be used in conjunction with, or separate from mechanical peeling 1026, such as wrapping the liner around a breaker bar at an angle that causes at least some peeling of the abrasive disc away from the liner. Other suitable removal methods may also be used, as indicated in block 1028.

In block 1030, the abrasive product is transported to a tool to which it will be applied. Transportation may be accomplished by coupling a transportation mechanism, such as a clamp, to the abrasive product during removal, and moving the transportation mechanism to a placement location.

In block 1040, the abrasive product is placed. Placement of an abrasive product may include coupling the abrasive product to a backup pad, in one embodiment. In another embodiment, the abrasive product may be applied directly to a robotic tool. It may be necessary to first dry the placement location, as indicated in block 1042. It may also be necessary to remove built-up adhesive, as indicated in block 1044, in embodiments where the abrasive product attaches using adhesive. It may also be necessary to remove non-adhesive buildup, as indicated in block 1046, such as built up polish, swarf, or other grinding aids. Removal of adhesive or swarf build up may be accomplished using a cleaning fluid, aqueous or otherwise, or by using a mechanical agitator, such as a brush.

In block 1050, a used abrasive product is removed from the tool. Removing an abrasive product may include using a clamp 1052 to grab a portion of the abrasive product extending beyond the footprint of the tool, as indicated in block 1054. However, other coupling mechanisms are also possible, as indicated in block 1056. Removing a used abrasive product may also include removing built up adhesive, as indicated in block 1062. Removing a used abrasive product may also include wiping, or otherwise removing, excess fluid 1064 from the tool surface.

In block 1060, a used abrasive product is disposed. If the used abrasive product includes hazardous material, disposal may include appropriate safety or other containment procedures.

At least some of the steps illustrated in block 1060, in some embodiments, are performed by the same tool. For example, the same tool may remove an abrasive product, as indicated in block 1020, transport the abrasive product, as indicated in block 1030, and place the abrasive product, as indicated in block 1040.

Similarly, while method 1000 indicates a set of steps in an order that may be experienced by a particular abrasive product, it is expressly contemplated that the order may occur differently when considered with respect to a disc dispensing system or a robot repair system. For example, a disc dispensing system may first remove used abrasive product, as indicated in block 1050, prior to retrieving a new abrasive product, as indicated in block 1020.

Systems and methods described herein are implemented by a disc changing system that is part of a robotic paint repair system. In sample embodiments, the robotic repair system includes: a robot manipulator that controls an end effector including at least one of sanding and polishing elements for at least one of sanding and polishing a substrate, a robot controller module that controls movements and operation of the robot manipulator. The control unit has one or more processors that process instructions to implement the steps of: receiving coordinates of each identified defect in the substrate along with characteristics of each defect, communicating coordinates of an identified defect in the substrate to the robot controller module along with any additional data needed for the robot controller module to control the robot manipulator to bring the end effector into close proximity to the identified defect on the substrate, receiving a repair action from the policy server based on defect characteristics and a previously learned control policy, providing characteristics of the defect and a current state of at least the end effector of the robot manipulator to the policy server, and executing the repair action by communicating instructions to the robot controller module and end effector to implement the repair action. The control unit further includes instructions for implementing the other steps of the method as described herein.

FIG. 11 illustrates an example computing device which may be useful in embodiments described herein. FIG. 11 is one example of a computing environment 1100 in which elements of FIGS. 6-7, 9-10, or parts of them (for example), can be deployed. With reference to FIG. 11, an example system for implementing some embodiments includes a general-purpose computing device in the form of a computer 1110. Components of computer 1110 may include, but are not limited to, a processing unit 1120 (which can comprise a processor), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. Memory, instructions and programs described with respect to FIGS. 8-9 can be deployed in corresponding portions of FIG. 11.

Computer 1110 typically includes a variety of computer readable media. Computer readable media can be any available media that can be accessed by computer 1110 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1130 includes computer storage media in the form of volatile and/or nonvolatile memory such as read only memory (ROM) 1131 and random access memory (RAM) 1132. A basic input/output system 1133 (BIOS) containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable and volatile/nonvolatile computer storage media. By way of example only, FIG. 11 illustrates a hard disk drive 1141 that reads from or writes to non-removable, nonvolatile magnetic media, nonvolatile magnetic disk 1152, an optical disk drive 1155, and nonvolatile optical disk 1156. The hard disk drive 1141 is typically connected to the system bus 1121 through a non-removable memory interface such as interface 1140, and optical disk drive 1155 are typically connected to the system bus 1121 by a removable memory interface, such as interface 1150.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137.

A user may enter commands and information into the computer 1110 through input devices such as a keyboard 1162, a microphone 1163, and a pointing device 1161, such as a mouse, trackball or touch pad. Other input devices (not shown) may include a joystick, game pad, satellite receiver, scanner, or the like. These and other input devices are often connected to the processing unit 1120 through a user input interface 1160 that is coupled to the system bus, but may be connected by other interface and bus structures. A visual display 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 is operated in a networked environment using logical connections, such as a Local Area Network (LAN) or Wide Area Network (WAN) to one or more remote computers, such as a remote computer 1180.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. In a networked environment, program modules may be stored in a remote memory storage device. FIG. 11 illustrates, for example, that remote application programs 1185 can reside on remote computer 1180.

Functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Also, it will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled," and variations thereof, are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The above-presented description and figures are intended by way of example only and are not intended to limit the illustrative embodiments in any way except as set forth in the appended claims. It is noted that various technical aspects of the various elements of the various exemplary embodiments that have been described above can be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

A disc changing system for a robotic defect repair system is presented. The system has a first abrasive disc and a second abrasive disc. The first and second abrasive discs are coupled to a liner. The system includes an abrasive disc placement device configured to automatically: remove the first abrasive disc from the liner, transport the first abrasive disc to a robotic tool of the robotic defect repair system, and place the first abrasive disc on a backup pad coupled to the robotic tool. The system also includes an abrasive disc remover configured to automatically remove the first abrasive disc after receiving a removal signal. The system also includes a controller configured to send an instruction to the disc placement device to remove, transport and place the first abrasive disc, instruct the robotic tool to conduct an abrasive operation. The controller is also configured to send the removal signal. The controller is a processor and the instructions are stored on a non-transitory computer-readable medium and executed by the processor.

The system may also include an abrasive disc verification system configured to validate placement of the abrasive disc on the backup pad. The controller may be configured to receive a validation signal from the disc changing system and, based on the validation signal, instruct the robotic tool to conduct the abrasive operation.

The controller may also be configured to, in response to the disc placement device removing the first abrasive disc, change an index of the disc changing system and advance the second abrasive disc such that, after the first abrasive disc is removed, the second abrasive disc can be removed, transported and placed by the disc placement device.

The disc changing system may also include a sensor configured to validate placement of the first abrasive disc and send the validation signal, and wherein the first abrasive disc has a color, the sensor is a color sensor, and the sensor validates placement of the first abrasive disc by detecting the color. The color may be a first color. The backup pad may be a second color, and the sensor may not send the validation signal if the second color is detected. The first color may be indicative of an abrasive grade of the first abrasive disc. The sensor may not send the validation signal if the abrasive grade is not the abrasive grade expected.

The system may also include a dryer and wherein the dryer, in response to a drying instruction from the controller, blows air at the backup pad, and wherein the controller sends the drying instruction after the disc remover removes the first abrasive disc from the backup pad.

The system may also include a cleaner that, in response to a cleaning instruction from the controller, cleans the first abrasive disc. The cleaner may be a brush that agitates the first abrasive disc to remove built up swarf.

The system may also be implemented such that the first abrasive disc couples to the backup pad using adhesive present on a backside of the first abrasive disc.

The system may also be implemented such that the first abrasive disc couples to the backup pad using a hook and loop system.

The system may be separated into a robotic cell portion and an operator accessible portion, and wherein a source of abrasive discs in the operator accessible portion, and wherein the abrasive disc placement device and the abrasive disc remover are located in the robotic cell portion.

The system may be implemented such that the abrasive disc placement device removes the first abrasive disc from the liner using at least one of a blower, a vacuum generating suction, and a breaker bar.

A method of automatically changing abrasive discs on a sanding robot is presented. The method includes removing a used abrasive disc from a backup pad. The used abrasive disc has a portion that extends beyond an area of the backup pad. Removing includes a clamp engaging the portion and pulling the used abrasive disc off of the backup pad. The method also includes selecting a new abrasive disc from a disc changing system. The disc changing system provides the new abrasive disc on a liner. Selecting the new abrasive disc includes an abrasive disc selector engaging the new abrasive disc and the new abrasive disc decoupling from the liner. The method also includes placing the new abrasive disc on the backup pad. The abrasive disc couples to the backup pad and disengages from the abrasive disc selector. The method also includes validating, using a sensor, placement of the new abrasive disc on the backup pad. The steps of removing, selecting, placing and validating are completed automatically based on instructions sent by a controller. The controller is a processor and the instructions are stored on a non-transitory computer-readable medium and executed by the processor.

The method may be implemented such that the instructions sent by the controller are based on a number of uses of the used abrasive disc.

The method may be implemented such that the instructions sent by the controller are based on an idle time of the used abrasive disc since a last operation.

The method may also include drying the backup pad using a nozzle to blow air at the backup pad before the new abrasive disc is placed on the backup pad.

The method may be implemented such that the new abrasive disc has a first color and the backup pad has a second color. Validating placement of the new abrasive disc may include detecting the first color on the backup pad.

The method may be implemented such that the used abrasive disc and the new abrasive disc each include an abrasive side and an attachment side. The attachment side may be adhesive. The adhesive is a pressure sensitive adhesive.

The method may be implemented such that the backup pad and the new abrasive disc are coupled using a hook and loop system. The new abrasive disc includes either a plurality of hooks or a plurality of loops.

The method may be implemented such that the abrasive disc selector engaging the new abrasive disc and the new abrasive disc decoupling from the liner is one of: bending the liner around a breaker bar to cause the abrasive disc to at least partially separate from the liner, blowing air at the edge of the abrasive disc, causing the abrasive disc to at least partially separate from the liner, or actuating a vacuum to apply suction to the liner to cause the abrasive disc to at least partially separate from the liner.

An automated abrasive disc changing system for a robotic abrading operation is presented. The system includes a plurality of abrasive discs on a liner and an abrasive disc selector that couples to a first of the plurality of abrasive discs. The first abrasive disc couples to the abrasive disc selector and decouples from the liner. The system also includes an abrasive disc placer that places the first abrasive disc on an abrasive tool. The abrasive tool is part of a robotic repair system. The abrasive tool, using the first abrasive disc, is configured to abrade a work surface. The system also includes an abrasive disc remover configured to engage the first abrasive disc on the abrasive tool and remove the abrasive disc from the abrasive tool.

The abrasive tool may be connected to a backup pad. The abrasive disc may removably couple directly to the backup pad.

The system may also include an air source that provides compressed air to an air nozzle. The air nozzle may blow compressed air on the backup pad after the abrasive disc is removed from the abrasive tool.

The system may be implemented such that an area of the abrasive disc extends beyond an area of the backup pad such that the abrasive disc remover can couple to a portion of the abrasive disc extending beyond the backup pad.

The system may be implemented such that one of the plurality of abrasive discs is a first abrasive disc. After the first abrasive disc is decoupled from the liner, a second abrasive disc is advanced. The plurality of abrasive discs may be arranged on the liner in a linear arrangement.

The system may also include a centering component that maintains the liner in a liner path such that the abrasive disc selector couples to each of the first and second abrasive discs in a similar position.

The system may be implemented such that the plurality of abrasive discs on the liner are provided as a roll. The liner may extend from the roll around a tension rod such that tension is maintained on the liner throughout the system.

The system may also include a cleaner that interacts with either the placed abrasive disc or the backup pad to remove built up swarf. The cleaner may be a brush.

The system may also include a controller that, in response to the first abrasive disc decoupling from the liner, indexes the system and advances the plurality of abrasive discs such that a second disc is available.

The system may be implemented such that the abrasive disc selector and the abrasive disc placer are a single component that decouples the first abrasive disc from the liner and places the first abrasive disc on the abrasive tool.

The system may be implemented such that the disc changing component also includes the abrasive disc remover, such that the first abrasive disc is removed by the disc changing component from the abrasive tool after an abrading operation, and a second abrasive disc is selected and placed on the abrasive tool.

The system may also include a placement sensor, wherein the placement sensor detects a placement of the first abrasive disc on the abrasive tool.

The system may also be implemented such that the first abrasive disc is a first color, the abrasive tool is a second color and the placement sensor is a color sensor that detects the difference between the first and second colors. If the first color is not detected, the abrasive tool may not engage in the abrading the work surface.

The system may also be implemented such that a first portion of the system is accessible to an operator, and a second portion of the system is inaccessible to the operator. The second portion may be part of a robotic cell.

The system may also be implemented such that the plurality of abrasive discs on the liner are within the first portion. The abrasive disc selector, abrasive disc placer and abrasive disc remover may be within the second portion.

The system may also be implemented such that the first abrasive disc couples to the abrasive tool using adhesive. The adhesive may be a pressure sensitive adhesive.

The system may be implemented such that the first abrasive disc couples to the abrasive tool using a hook and loop system.

The system may be implemented such that the abrasive disc selector decouples the first abrasive disc from the liner using at least one of a blower, a vacuum generating suction, and a breaker bar.

A roll of abrasive abrasives for automated disc dispensing is presented. The roll includes a release liner and a plurality of abrasive discs removably coupled to the release liner. Each of the plurality of abrasive discs includes abrasive material on a first side and adhesive on a second side. The plurality of abrasive discs are aligned in a single row, spaced apart such that an automated disc dispensing system can retrieve each of the plurality of abrasive discs in turn.

The roll may be implemented such that the discs are aligned such that a first center of a first disc is in linear alignment with a second center of a second disc and a third center of a third disc, and wherein the first, second and third discs are in sequential order on the roll.

The roll may be implemented such that the first center and the second center are spaced such that adjacent discs are not in contact on the liner.

The roll may be implemented such that each of the plurality of abrasive discs have a non-circular perimeter.

The roll may be implemented such that each of the plurality of abrasive discs includes a protrusion configured to assist in removal of each of the plurality of abrasive discs from the liner by the automated disc dispensing system.

What is claimed is:

1. An automated abrasive disc changing system for a robotic abrading operation, the system comprising:
   a plurality of abrasive discs on a liner;
   an abrasive disc selector that couples to a first of the plurality of abrasive discs, wherein the first abrasive disc couples to the abrasive disc selector and decouples from the liner;
   an abrasive disc placer that places the first abrasive disc on an abrasive tool, wherein the abrasive tool is part of a robotic repair system, and wherein the abrasive tool, using the first abrasive disc, is configured to abrade a work surface; and
   an abrasive disc remover configured to engage the first abrasive disc on the abrasive tool and remove the first abrasive disc from the abrasive tool.

2. The system of claim 1, wherein the abrasive tool is connected to a backup pad, and wherein the abrasive first disc removably couples directly to the backup pad.

3. The system of claim 2, and further comprising an air source that provides compressed air to an air nozzle, wherein the air nozzle blows compressed air on the backup pad after the first abrasive disc is removed from the abrasive tool.

4. The system of claim 2, wherein an area of the first abrasive disc extends beyond an area of the backup pad such that the abrasive disc remover can couple to a portion of the first abrasive disc extending beyond the backup pad.

5. The system of claim 1, wherein the one of the plurality of abrasive discs is the first abrasive disc, and wherein, after the first abrasive disc is decoupled from the liner, a second abrasive disc is advanced, and wherein the plurality of abrasive discs are arranged on the liner in a linear arrangement.

6. The system of claim 5, wherein the system also includes a centering component that maintains the liner in a liner path such that the abrasive disc selector couples to each of the first and second abrasive discs in a similar position.

7. The system of claim 1, wherein the plurality of abrasive discs on the liner are provided as a roll, and wherein the liner extends from the roll around a tension rod such that tension is maintained on the liner throughout the system.

8. The system of claim 1, further comprising a cleaner that interacts with either the placed first abrasive disc or a backup pad to remove built up swarf.

9. The system of claim 8, wherein the cleaner is a brush.

10. The system of claim 1, further comprising a controller that, in response to the first abrasive disc decoupling from the liner, indexes the system and advances the plurality of abrasive discs such that the second abrasive disc is available.

11. The system of claim 1, wherein the abrasive disc selector and the abrasive disc placer are a single component that decouples the first abrasive disc from the liner and places the first abrasive disc on the abrasive tool.

12. The system of claim 11, wherein the first abrasive disc is removed by a disc changing component from the abrasive tool after an abrading operation, and a second abrasive disc is selected and placed on the abrasive tool, wherein the disc changing component also comprises the abrasive disc remover.

13. The system of claim 1, further comprising a placement sensor, wherein the placement sensor detects a placement of the first abrasive disc on the abrasive tool.

14. The system of claim 13, wherein the first abrasive disc is a first color, the abrasive tool is a second color and the placement sensor is a color sensor that detects the difference between the first and second colors, and wherein if the first color is not detected, the abrasive tool will not engage in the abrading the work surface.

15. The system of claim 1, wherein a first portion of the system is accessible to an operator, and a second portion of the system is inaccessible to the operator, wherein the second portion is part of a robotic cell.

16. The system of claim 13, wherein the plurality of abrasive discs on the liner are within a first portion of the system, and wherein the abrasive disc selector, the abrasive disc placer and the abrasive disc remover are within a second portion of the system.

17. The system of claim 1, wherein the first abrasive disc couples to the abrasive tool using an adhesive.

18. The system of claim 17, wherein the adhesive is a pressure sensitive adhesive.

19. The system of claim 1, wherein the first abrasive disc couples to the abrasive tool using a hook and loop system.

20. The system of claim 1, wherein the abrasive disc selector decouples the first abrasive disc from the liner using at least one of a blower, a vacuum generating suction, and a breaker bar.

* * * * *

UNITED STATES PATENT AND TRADEMARK OFFICE
CERTIFICATE OF CORRECTION

| | | |
|---|---|---|
| PATENT NO. | : 12,275,115 B2 | Page 1 of 1 |
| APPLICATION NO. | : 18/505266 | |
| DATED | : April 15, 2025 | |
| INVENTOR(S) | : Aaron K. Nienaber et al. | |

It is certified that error appears in the above-identified patent and that said Letters Patent is hereby corrected as shown below:

In the Claims

<u>Column 16</u>
Line 29, In Claim 2, delete "abrasive first disc" and insert -- first abrasive disc --, therefor.

Signed and Sealed this
Twenty-first Day of October, 2025

John A. Squires
*Director of the United States Patent and Trademark Office*